US012729321B2

(12) United States Patent
Grötzinger et al.

(10) Patent No.: US 12,729,321 B2
(45) Date of Patent: Sep. 8, 2026

(54) FLOOR PROTECTION SYSTEM WITH HIGH DYNAMIC CRACK BRIDGING

(71) Applicant: SIKA TECHNOLOGY AG, Baar (CH)

(72) Inventors: Jochen Grötzinger, Schwäbisch Gmünd (DE); Uwe Von Der Brüggen, Meckesheim (DE); Oguz Sarioglu, Heilbronn (DE); Edis Kasemi, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 630 days.

(21) Appl. No.: 18/024,908

(22) PCT Filed: Nov. 8, 2021

(86) PCT No.: PCT/EP2021/080924
§ 371 (c)(1),
(2) Date: Mar. 6, 2023

(87) PCT Pub. No.: WO2022/096707
PCT Pub. Date: May 12, 2022

(65) Prior Publication Data

US 2023/0312975 A1 Oct. 5, 2023

(30) Foreign Application Priority Data

Nov. 9, 2020 (EP) .................................... 20206557

(51) Int. Cl.
*C09D 175/00* (2006.01)
*C09D 7/63* (2018.01)
*C09D 163/00* (2006.01)

(52) U.S. Cl.
CPC ............ *C09D 175/00* (2013.01); *C09D 7/63* (2018.01); *C09D 163/00* (2013.01)

(58) Field of Classification Search
CPC ...... C09D 175/00; C09D 7/63; C09D 163/00; C09D 175/04; C08G 59/50; C08L 75/04
See application file for complete search history.

(56) References Cited

U.S. PATENT DOCUMENTS 5,739,209 A 4/1998 Lassila et al.
2017/0002231 A1* 1/2017 Häberle ............... C09D 175/08
2018/0094175 A1* 4/2018 Kasemi .............. C08G 59/5033
2019/0040253 A1* 2/2019 Kasemi ................ C08G 65/336
2020/0354604 A1* 11/2020 Grötzinger ........... C09D 163/00

FOREIGN PATENT DOCUMENTS

WO 2016/023839 A1 2/2016
WO 2017/037069 A1 3/2017
WO WO-2019134821 A1 * 7/2019 ............ C08K 5/101

OTHER PUBLICATIONS

Jan. 31, 2022 International Search Report issued in International Patent Application No. PCT/EP2021/080924.

* cited by examiner

*Primary Examiner* — Blaine Copenheaver
(74) *Attorney, Agent, or Firm* — Oliff PLC

(57) ABSTRACT

A floor protection system including (i) optionally at least one epoxy resin primer, (ii) at least one polyurethane coating, (iii) optionally quartz sand, which has been scattered into and/or onto the polyurethane coating, and (iv) an epoxy resin sealant, obtained from a resin component containing at least one epoxy liquid resin and a hardener component containing at least one amine of formula (I). The floor protection system has an aesthetically pleasing, hard and robust surface and a good dynamic crack bridging with surprisingly high elasticity of the sealant. The system is particularly suitable as a surface protection system for parking levels and drivable ramps.

14 Claims, No Drawings

FLOOR PROTECTION SYSTEM WITH HIGH DYNAMIC CRACK BRIDGING

TECHNICAL FIELD

The invention relates to a multilayer surface protection system with high dynamic crack bridging for the floors of parking decks.

PRIOR ART

Coating systems composed of crosslinked polymers such as polyurethane or epoxy resin are known as surface protection systems for built concrete structures. Requirements are different depending on the built structure. The floors of parking decks require a surface protection system that permanently protects the underlying floor, typically consisting of steel-reinforced concrete, from the penetration of moisture, saltwater, fuels, lubricant oil and other substances that act as staining on the floor, has a hard robust surface with good slip prevention, and meets high esthetic demands. In addition, the surface protection system is to be easily applicable, is not to cause excessive emissions as a result of solvents or strong odors and is to have good crack-bridging properties, in order that it is not damaged in the event of movements in the underlying floor on account of temperature changes, agitation and mechanical stresses as a result of being driven over.

Surface protection systems and the associated requirements and tests are described in various guidelines and standards, for example in the guideline "Schutz and Instandsetzung von Betonbauwerken" [Protection and Maintenance of Built Concrete Structures] from the Deutscher Ausschuss für Stahlbeton [German Association for Steel-Reinforced Concrete] or DIN EN 1504-2, where the OS 10 and OS 11 surface protection systems having high dynamic crack bridging capacity are described, and in EN 1062-7 Method B 3.2 or B 4.2, where testing of dynamic crack bridging at −20° C. with a change in crack width of 0.2 or 0.3 mm is described. This involves agitating a concrete crack 1000 times at −20° C. with a frequency of 0.03 Hz, during which no cracks must form in the coating system above. In the revised guideline, a new aspect is that no cracks may be visible even on the surface of the seal.

Surface protection systems for parking decks typically comprise an elastic polyurethane coating and a seal (topcoat) made of hard, vitreous epoxy resin material. This is very robust, i.e. impact- and scratch-resistant, and also abrasion-resistant, but barely extensible and hence critical in relation to crack formation. In the surface protection systems known from the prior art, in the test for dynamic crack bridging described, small cracks form in the seal, even when the underlying polyurethane coating remains undamaged. But microcracks in the seal mean weakening of the surface protection system, especially in the case of penetrating soils. This impairs the appearance of the floor and impacts the service life of the polyurethane coating. There is no known prior art surface protection system for parking decks that passes the test for dynamic crack bridging entirely without crack formation in the seal.

U.S. Pat. No. 5,739,209 describes epoxy resin products comprising alkylated 2-methylpentane-1,5-diamine as curing agent and an acrylate copolymer for flexibilization. The resultant products are not hard enough for use as seal for parking deck coatings.

Epoxy resin coatings comprising N-benzylpropane-1,2-diamine or N-benzylethane-1,2-diamine in the curing agent are described in EP 3,180,383 or EP 3,344,677. These amines enable coatings having nice surfaces and high gloss, even when cured under cold conditions.

SUMMARY OF THE INVENTION

It is an object of the present invention to provide a surface protection system for the floors of parking decks, which overcomes the disadvantages of the prior art in relation to crack formation in the seal.

This object is surprisingly achieved by a floor protection system as claimed in claim 1. The floor protection system comprises at least one polyurethane coating that has optionally been scattered with quartz sand and an epoxy resin seal obtained from a resin component comprising at least one liquid epoxy resin, and a curing agent component containing at least one amine of the formula (I). The floor protection system has excellent compatibility and adhesion of the layers, and surprisingly high extensibility of the seal, coupled with high hardness, robustness and esthetic standards of the surface. Surprisingly, the amine of the formula (I) improves mechanical compatibility between the elastic polyurethane coating and the comparatively rigid epoxy resin seal, as a result of which such a floor protection system has high crack bridging without crack formation in the seal. The floor protection system of the invention is easily installable with low odor nuisance, and cures rapidly and reliably even at low ambient temperatures. The seal has good applicability without or with only a small amount of thinner in the desired layer thickness with a sufficiently long pot life, rapidly giving rise to a well-deaerated, smooth, even surface without specks or craters, and a low tendency to yellowing. The floor protection system has good extensibility and elasticity on the lower side facing the substrate, and has a hard robust surface with high abrasion resistance and scratch resistance, and high robustness to cold, heat, water, deicing salt, fuels, engine oil and customary detergents. For particularly good slip prevention, the floor protection system has been scattered with quartz sand, with application of the seal on top of the partly protruding sand grains embedded into the polyurethane coating. The well-adhering epoxy resin seal prevents grains of sand from breaking out under mechanical stress.

The floor protection system of the invention is capable of meeting the demands on a surface protection system OS 10 and OS 11 a in relation to dynamic crack bridging at −20° C. entirely without crack formation in the seal, and hence is particularly suitable as surface protection system for parking decks and ramps that can be driven on.

Further aspects of the invention are the subject of further independent claims. Particularly preferred embodiments of the invention are the subject of the dependent claims.

Ways of Executing the Invention

The invention provides a floor protection system comprising (i) optionally at least one epoxy resin primer,
(ii) at least one polyurethane coating,
(iii) optionally quartz sand, scattered into and/or onto the polyurethane coating, and
(iv) an epoxy resin seal obtained from a resin component containing at least one liquid epoxy resin and a curing agent component containing at least one amine of the formula (I)

$$Z\text{—NH-A-NH—}CH_2\text{—}Y \qquad (I)$$

where

A is a divalent $C_2$ to $C_{15}$ alkylene, cycloalkylene or arylalkylene radical optionally containing one or more nitrogen atoms or ether groups, Z is H or —$CH_2$—Y and Y is H or a $C_1$ to $C_{11}$ alkyl, cycloalkyl, arylalkyl or aryl radical, wherein the two nitrogen atoms to which the A radical is bonded are separated from one another by at least two carbon atoms, and the amine of the formula (I) contains a total of at least 8 carbon atoms.

"Polyurethane" refers to a composition or cured elastic polymer having urethane groups and optionally urea groups.

"Seal" refers to the uppermost layer of a floor coating (topcoat).

"Liquid epoxy resin" refers to an industrial polyepoxide having a glass transition temperature below 25° C.

A "storage stable" composition refers to one that can be stored at room temperature in a suitable container over a prolonged period, typically over at least 3 months up to 6 months or more, without this storage resulting in any change in its application or use properties to an extent relevant to its use.

Substance names beginning with "poly", such as polyisocyanate, polyamine or polyepoxide, refer to substances that formally contain two or more of the functional groups that occur in their name per molecule.

A "primary amino group" refers to an amino group that is attached to a single organic radical and bears two hydrogen atoms; a "secondary amino group" refers to an amino group that is attached to two organic radicals that may also together be part of a ring and bears one hydrogen atom; and a "tertiary amino group" refers to an amino group that is attached to three organic radicals, two or three of which may also be part of one or more rings, and does not bear any hydrogen atom.

"Amine hydrogen" refers to the hydrogen atoms of primary and secondary amino groups.

"Amine hydrogen equivalent weight" refers to the mass of an amine or an amine-containing composition that contains one molar equivalent of amine hydrogen.

"Thinner" refers to a liquid which is capable of lowering the viscosity of a curable composition and is not incorporated chemically into the polymer on curing.

"Molecular weight" refers to the molar mass (in grams per mole) of a molecule.

"Average molecular weight" refers to the number average $M_n$ of a polydisperse mixture of oligomeric or polymeric molecules. It is determined by gel-permeation chromatography (GPC) against polystyrene as standard.

"Pot life" refers to the period of time from the mixing of the components of a multicomponent curable composition within which the composition can be processed without losses.

The "gel time" refers to the period of time from the mixing of the components of an epoxy resin composition until the gelation thereof.

"Room temperature" refers to a temperature of 23° C.

All industry standards and norms mentioned in this document relate to the versions valid at the date of first filing.

Percentages by weight (% by weight), abbreviated to wt %, refer to proportions by mass of a constituent of a composition or a molecule, based on the overall composition or the overall molecule, unless stated otherwise. The terms "mass" and "weight" are used synonymously in the present document.

Preferably, (i) to (iv) are arranged in that sequence from the bottom upward, starting from the floor or substrate.

Preferably, (i) to (iv) are in direct contact with one another.

Preferably, the at least one polyurethane coating (ii) and the epoxy resin seal (iv) are in direct contact with one another, and optionally additionally in contact with quartz sand (iii).

Preferably, the polyurethane coating has a layer thickness in the range from 2 to 6 mm.

Preferably, the polyurethane coating is elastic.

Preferably, the polyurethane coating consists of one or more layers, and at least one of these layers has an elongation at break of at least 200%, especially at least 300%, determined at 23° C. to DIN EN 53504 at a strain rate of 200 mm/min. If the polyurethane coating consists of multiple layers, at least the lowermost layer viewed from the floor in particular has an elongation at break of at least 200%, especially at least 300%.

Preferably, the polyurethane coating consists of two layers, wherein the lower layer, also called sealing layer, has a thickness in the range from 1.2 to 3 mm and an elongation at break of at least 200%, preferably at least 300%, and the upper layer, also called wear layer, has a thickness in the range from 1.2 to 3 mm and a tensile strength of at least 9 MPa, preferably at least 10 MPa, and has optionally been filled and/or scattered with quartz sand, wherein tensile strength and elongation at break are determined at 23° C. to DIN EN 53504 at a strain rate of 200 mm/min.

In particular, the seal layer has higher extensibility and lower hardness than the wear layer.

Such a structure of the polyurethane coating enables a particularly robust floor protection system having good crack bridging, wherein the lower seal layer is capable of particularly efficiently absorbing the extension and compression forces that act on the floor protection system via fissure movements in the floor beneath, the wear layer on top assures high hardness and robustness of the floor protection system, and any quartz sand scattered in enables high slip prevention and additionally promotes high hardness and robustness.

The floor protection system preferably comprises quartz sand that has been scattered onto the polyurethane coating. The surface of the polyurethane coating has thus preferably been scattered with quartz sand.

The polyurethane coating is applied to a floor that has optionally been pretreated with at least one primer.

The surface of the floor, or the substrate, to which the floor protection system is applied, especially consists of concrete, mortar, cement screed, fiber cement, brick, tile, gypsum, natural stone such as granite or marble, asphalt, a repair or leveling compound based on PCC (polymer-modified cement mortar) or ECC (epoxy resin-modified cement mortar), or a combination thereof.

The substrate has optionally been pretreated, especially by means of grinding, sandblasting or shotblasting.

The substrate is preferably concrete, especially steel-reinforced concrete.

Before the polyurethane coating is applied, preference is given to applying at least one epoxy resin primer to the floor. The primer especially serves to consolidate the surface of the floor, to close any pores, and to ensure good adhesion between the floor and the polyurethane coating.

The primer is typically distributed with a paintbrush, a bristle brush, a roller or a rubber squeegee. Application is effected in one or more layers, typically in an amount in the range from about 0.2 to 0.5 kg/$m^2$.

Suitable epoxy resin primers are commercially available products, especially Sikafloor®-150, Sikafloor®-151, Sikafloor®-160 or Sikafloor®-161 (all from Sika).

The polyurethane coating is applied, especially in the liquid state, to the optionally primed floor.

The polyurethane coating in the liquid state preferably contains at least one polyisocyanate and/or at least one polymer containing isocyanate groups.

A suitable polyisocyanate is especially an oligomeric or polymeric derivative of at least one diisocyanate, preferably selected from the group consisting of diphenylmethane diisocyanate (MDI), toluene diisocyanate (TDI), hexane 1,6-diisocyanate (HDI) and isophorone diisocyanate (IPDI).

Among these, preference is given to carbodiimides or uretonimines of MDI, polymeric MDI, oligomeric TDI, biurets, isocyanurates, uretdiones, iminooxadiazinediones or allophanates of HDI, isocyanurates of IPDI or mixed isocyanurates of TDI and HDI.

Particular preference is given to a room temperature liquid form of MDI, especially polymeric MDI or a carbodiimide or uretonimine of MDI. "Polymeric MDI" refers here to a mixture of MDI and MDI homologs.

A suitable polymer containing isocyanate groups is preferably obtained from the reaction of at least one diisocyanate and at least one polyol. This involves mixing an excess of monomeric diisocyanate with the polyol, and reacting them in the absence of moisture at a temperature in the range from 20 to 160° C., preferably 40 to 140° C., optionally in the presence of a suitable catalyst. Preference is given to a molar NCO/OH ratio in the range from 1.5/1 to 10/1, preferably 1.8/1 to 7/1.

A suitable diisocyanate for the preparation of a polymer containing isocyanate groups is especially MDI, TDI, xylene diisocyanate (XDI), HDI, IPDI or perhydro(diphenylmethane diisocyanate) (HMDI).

Preference is given to MDI, especially diphenylmethane 4,4'-diisocyanate or mixtures thereof with diphenylmethane 2,4'-diisocyanate, or TDI, especially toluene 2,4-diisocyanate, or mixtures thereof with toluene 2,6-diisocyanate, or IPDI.

Suitable polyols for the preparation of a polymer containing isocyanate groups are especially commercial polyether polyols, polyester polyols, polycarbonate polyols, polyacrylate polyols, or hydrocarbons containing OH groups.

Preference is given to polyether polyols, especially diols or triols based on polypropylene glycol or polytetramethylene ether glycol.

Preference is given to polyols having an average molecular weight $M_n$ in the range from 400 to 8000 g/mol, especially 1000 to 4000 g/mol.

Suitable polyurethane coatings are one-component or multicomponent polyurethanes.

One-component polyurethanes contain all ingredients in a single moisture-tight container, and are storage-stable in that form. On application, they come into contact with moisture, as a result of which they cure. They are therefore also referred to as "moisture-curing". As well as polyisocyanates and/or polymers containing isocyanate groups and further ingredients such as fillers, plasticizers, catalysts etc., they optionally contain what are called latent curing agents, especially aldimines.

Two-component polyurethanes contain a curing agent component and an isocyanate component that are packed in two separate containers and are mixed only shortly before use or when they are used. They cure in the mixed state via reaction of the ingredients and any additional moisture.

The polyurethane coating preferably has two components.

The curing agent component preferably contains at least one curing agent selected from polyols, di- or polyhydric alcohols and polyamines.

Suitable polyols are commercial polyols, especially polyether polyols, especially the polyether polyols already mentioned with polymer particles dispersed therein, polyester polyols, polycarbonate polyols, poly(meth)acrylate polyols, natural fats and oils containing hydroxyl groups, especially castor oil, chemically modified natural fats and oils, and polyhydrocarbon polyols.

Preference is given to polyether polyols, aliphatic polyester polyols, aliphatic polycarbonate polyols, castor oil, derivatives of castor oil or polybutadiene polyols.

Preference is given to polyols having an average molecular weight $M_n$ in the range from 400 to 6000 g/mol, especially 500 to 4000 g/mol.

Preference is given to polyols having an average OH functionality in the range from 1.7 to 3.

Preference is given to polyols having at least partly primary hydroxyl groups. Such polyols are particularly reactive with isocyanates.

Suitable di- or polyhydric alcohols are especially ethane-1,2-diol, propane-1,3-diol, butane-1,4-diol, pentane-1,5-diol, hexane-1,6-diol, cyclohexane-1,4-dimethanol or diethylene glycol.

Suitable polyamines are especially those with highly sterically and/or electronically hindered amino groups, especially aromatic diamines, especially 3,5-diethyltoluene-2,4(6)-diamine (DETDA, available as Ethacure® 100 from Albemarle), 3,5-dimethylthiotoluene-2,4(6)-diamine (available as Ethacure® 300 from Albemarle) or addition products of diethyl maleate onto aliphatic polyamines (available as Desmophen® NH 1220, Desmophen® NH 1420 or Desmophen® NH 1520 from Covestro).

The isocyanate component contains at least one polyisocyanate and/or polymer containing isocyanate groups, as described above.

The polyurethane coating preferably contains further ingredients, especially selected from further curing agents, fillers, pigments, plasticizers, catalysts, adhesion promoters, desiccants, solvents, thinners, defoamers, deaerating agents, antisettling agents and stabilizers. Such further ingredients may be present as a constituent of the curing agent component and/or of the isocyanate component, or as a separate component.

Before or during application, the curing agent component and the isocyanate component and any further components present are mixed. The mixing ratio between the curing agent component and the isocyanate component is preferably chosen such that a ratio of the isocyanate groups to the reactive groups of the curing agent component is in the range from 0.5 to 1.1, preferably 0.7 to 1.0. Excess isocyanate groups crosslink with one another with moisture from the environment.

The mixing of the components and possibly contacting with moisture results in curing by chemical reaction, giving rise to the cured polyurethane coating.

In the case of a one-component polyurethane coating, no mixing of the components is necessary. The applying causes the coating to come into contact with moisture, as a result of which curing proceeds through chemical reaction with moisture and the cured polyurethane coating is formed.

The polyurethane coating is preferably applied at ambient temperature, especially by pouring, followed by uniform distribution with the aid, for example, of a doctor blade, a rubber squeegee or a roller, in the desired amount.

The polyurethane coating can be applied in one or more layers. In the case of application in two or more layers, the composition of the polyurethane coating may be the same, or the polyurethane coatings may have a different composition.

In a preferred embodiment, the polyurethane coating is applied in just one layer, especially in an amount in the range from 1.8 to 3 $kg/m^2$, which is preferably additionally filled and scattered with quartz sand. A polyurethane coating suitable for this purpose is one having high extensibility, especially at least 200%, preferably at least 300%.

In a further preferred embodiment, two layers of polyurethane coatings that differ in their composition are applied. First of all, a polyurethane coating having high extensibility, as described above, is applied in an amount in the range from 1.5 to 3 $kg/m^2$ and allowed to cure, followed by a polyurethane coating having moderate extensibility and high strength, especially a tensile strength of at least 9 MPa, preferably at least 10 MPa, which is preferably additionally filled and scattered with quartz sand.

This two-layer structure is particularly preferred. In the lower region of the floor protection system, it enables high extensibility and flexibility, and further up enables higher hardness coupled with higher stiffness. Moreover, in a two-layer structure, a higher layer thickness is achieved overall, which is advantageous for the quality and durability of the coating.

A suitable polyurethane coating having high extensibility and moderate strength is especially a two-component polyurethane coating based on a TDI polymer and 3,5-dimethylthiotoluene-2,4(6)-diamine as curing agent, especially Sikafloor®-376(from Sika).

A suitable polyurethane coating having moderate extensibility and high strength is especially a two-component polyurethane coating based on a liquid form of MDI and castor oil and/or castor oil-based polyol as curing agent, especially Sikafloor®-377 (from Sika).

Tensile strength and elongation at break of the polyurethane coating are each determined at 23° C. to DIN EN 53504 at a strain rate of 200 mm/min on dumbbell-shaped test specimens of thickness 2 mm, which are free of additionally scattered-in quartz sand.

Suitable quartz sand for scattering-in and/or scattering in excess into and onto the still-liquid polyurethane coating is especially quartz sand having a grain size in the range from 0.05 to 10 mm.

Preference is given to scattering the freshly applied polyurethane coating firstly with a relatively fine quartz sand, especially with a grain size in the range from 0.1 to 0.3 mm, such that the sand as additional filler sinks completely into the coating, and then scattering the surface with a coarser quartz sand, especially having a grain size in the range from 0.3 to 0.8 mm, in excess, with removal of excess quartz sand after the curing of the polyurethane coating, especially by means of a vacuum cleaner or brush. This affords a grainy surface that enables particularly high slip resistance and hardness.

The epoxy resin seal is applied to the polyurethane coating that has optionally been scattered with quartz sand. It is obtained from a resin component containing at least one liquid epoxy resin and a curing agent component containing at least one amine of the formula (I).

Preferred liquid epoxy resins are aromatic diepoxides that are liquid at room temperature and have an epoxy equivalent weight in the range from 110 to 200 g/mol, preferably 150 to 200 g/mol, especially technical grade bisphenol A diglycidyl ether and/or bisphenol F diglycidyl ether, as commercially available, for example, from Olin, Huntsman or Momentive. These liquid resins enable rapid curing and high hardness and robustness.

Together with the liquid epoxy resin, the resin component may contain further constituents containing epoxy groups, especially fractions of solid bisphenol A resin or novolak glycidyl ethers or reactive diluents.

Suitable reactive diluents are especially butanediol diglycidyl ether, hexanediol diglycidyl ether, trimethylolpropane di- or triglycidyl ether, phenyl glycidyl ether, cresyl glycidyl ether, guaiacol glycidyl ether, 4-methoxyphenyl glycidyl ether, p-n-butylphenyl glycidyl ether, p-tert-butylphenyl glycidyl ether, 4-nonylphenyl glycidyl ether, 4-dodecylphenyl glycidyl ether, cardanol glycidyl ether, benzyl glycidyl ether, allyl glycidyl ether, butyl glycidyl ether, hexyl glycidyl ether, 2-ethylhexyl glycidyl ether, or glycidyl ethers of natural alcohols, such as in particular $C_8$ to $C_{10}$ or $C_{12}$ to $C_{14}$ or $C_{13}$ to $C_{15}$ alkyl glycidyl ethers.

The curing agent component contains at least one amine of the formula (I)

$$Z—NH-A-NH—CH_2—Y \quad (I)$$

where

A is a divalent $C_2$ to $C_{15}$ alkylene, cycloalkylene or arylalkylene radical optionally containing one or more nitrogen atoms or ether groups, Z is H or $—CH_2—Y$ and Y is H or a $C_1$ to $C_{11}$ alkyl, cycloalkyl, arylalkyl or aryl radical, wherein the two nitrogen atoms to which the A radical is bonded are separated from one another by at least two carbon atoms, and the amine of the formula (I) contains a total of at least 8 carbon atoms.

A is preferably selected from the group consisting of 1,2-ethylene, 1,2-propylene, 1,3-propylene, 1,4-butylene, 1,3-butylene, 2-methyl-1,2-propylene, 1,3-pentylene, 1,5-pentylene, 2,2-dimethyl-1,3-propylene, 1,6-hexylene, 2-methyl-1,5-pentylene, 1,7-heptylene, 1,8-octylene, 2,5-dimethyl-1,6-hexylene, 1,9-nonylene, 2,2(4),4-trimethyl-1,6-hexylene, 1,10-decylene, 1,11-undecylene, 2-butyl-2-ethyl-1,5-pentylene, 1,12-dodecylene, 1,2-cyclohexylene, 1,3-cyclohexylene, 1,4-cyclohexylene, (1,5,5-trimethylcyclohexan-1-yl)methane-1,3,4(2)-methyl-1,3-cyclohexylene, 1,3-cyclohexylenebis(methylene), 1,4-cyclohexylenebis(methylene), 1,3-phenylenebis(methylene), 1,4-phenylenebis(methylene), 3-oxa-1,5-pentylene, 3,6-dioxa-1,8-octylene, 4,7-dioxa-1,10-decylene, 3-aza-1,5-pentylene, 3,6-diaza-1,8-octylene, 4,7-diaza-1,11-decylene and 3-aza-1,6-hexylene.

A is preferably free of nitrogen atoms. This affords seals having particularly nice surfaces.

A is preferably free of ether groups. This affords seals having particularly good hydrolysis stability.

More preferably, A is a $C_2$ to $C_8$ alkylene, cycloalkylene or arylalkylene radical, especially 1,2-ethylene, 1,2-propylene, 1,3-propylene, 1,4-butylene, 1,3-butylene, 1,5-pentylene, 1,6-hexylene, 2-methyl-1,5-pentylene, 1,7-heptylene, 1,8-octylene, 1,3-cyclohexylenebis(methylene), 1,4-cyclohexylenebis(methylene) or 1,3-phenylenebis(methylene). These amines of the formula (I) enable particularly good leveling properties.

A is most preferably 1,2-ethylene. These amines of the formula (I) enable particularly good leveling, particularly good deaeration, particularly rapid curing and particularly low yellowing.

Y is preferably selected from the group consisting of H, methyl, ethyl, propyl, isopropyl, butyl, pentyl, heptyl, hept- 2-yl, phenyl, 4-methylphenyl, 4-isopropylphenyl, 4-tert-butylphenyl, 4-methoxyphenyl, 4-dimethylaminophenyl, 1-naphthyl, benzyl and cyclohexyl.

More preferably, Y is phenyl or cyclohexyl, especially phenyl. Such an amine of the formula (I) enables particularly rapid curing and particularly attractive surfaces having high gloss.

The amine of the formula (I) is preferably selected from the group consisting of N-benzylethane-1,2-diamine, N,N'-dibenzylethane-1,2-diamine, N-(4-methylbenzyl)ethane-1,2-diamine, N,N'-bis(4-methylbenzyl)ethane-1,2-diamine, N-(4-isopropylbenzyl)ethane-1,2-diamine, N,N'-bis(4-isopropylbenzyl)ethane-1,2-diamine, N-(4-tert-butylbenzyl)ethane-1,2-diamine, N,N'-bis(4-tert-butylbenzyl)ethane-1,2-diamine, N-(4-methoxybenzyl)ethane-1,2-diamine, N,N'-bis(4-methoxybenzyl)ethane-1,2-diamine, N-(4-dimethylaminobenzyl)ethane-1,2-diamine, N,N'-bis(4-dimethylaminobenzyl)ethane-1,2-diamine, N-(1-naphthylmethyl)ethane-1,2-diamine, N,N'-bis(1-naphthylmethyl)ethane-1,2-diamine, N-cyclohexylmethylethane-1,2-diamine, N,N'-bis(cyclohexylmethyl)ethane-1,2-diamine, N-benzylpropane-1,2-diamine, N,N'-dibenzylpropane-1,2-diamine, N-benzylhexane-1,6-diamine, N,N'-dibenzylhexane-1,6-diamine, N-benzyl-2-methylpentane-1,5-diamine, N,N'-dibenzyl-2-methylpentane-1,5-diamine, N-benzyl-1,3-bis(aminomethyl)benzene, N,N'-dibenzyl-1,3-bis(aminomethyl)benzene, N-(2-ethylhexyl)-1,3-bis(aminomethyl)benzene, N,N'-bis(2-ethylhexyl)-1,3-bis(aminomethyl)benzene, N-benzyl-1,3-bis(aminomethyl)cyclohexane, N,N'-dibenzyl-1,3-bis(aminomethyl)cyclohexane, N-phenylethyl-1,3-bis(aminomethyl)benzene and N,N'-bis(phenylethyl)-1,3-bis(aminomethyl)benzene.

Most preferably, A is 1,2-ethylene and Y is phenyl. Such an amine of the formula (I) is N-benzylethane-1,2-diamine, N,N'-dibenzylethane-1,2-diamine or a mixture thereof, especially a mixture in a weight ratio in the range from 70/30 to 90/10 between N-benzylethane-1,2-diamine and N,N'-dibenzylethane-1,2-diamine. Such an amine of the formula (I) enables low-yellowing, low-odor epoxy resin seals having particularly good leveling, particularly rapid curing and a particularly even, well-deaerated surface.

Z is preferably H. Such an amine of the formula (I) enables particularly rapid curing.

The most preferred amine of the formula (I) is N-benzylethane-1,2-diamine.

The amine of the formula (I) is preferably prepared by partial alkylation of at least one amine of the formula $H_2N$-A-$NH_2$ with at least one alkylating agent. The alkylation is preferably a reductive alkylation using an aldehyde of the formula Y—CH═O as alkylating agent and hydrogen.

The amine of the formula (I) may be in free form or in the form of an adduct with at least one epoxy resin, especially at least one aromatic diepoxide having an epoxy equivalent weight in the range from 110 to 200 g/mol, preferably 150 to 200 g/mol, especially a bisphenol A diglycidyl ether and/or bisphenol F diglycidyl ether. This adduct is especially prepared with such an excess of amine that at least 1.3 mol of amine of the formula (I) was used per epoxy group.

The amine of the formula (I) is preferably in free, non-adducted form.

The amine of the formula (I) is preferably present in the epoxy resin seal in such an amount that 5% to 80%, preferably 10% to 50%, of all amine hydrogens present in the curing agent component come from amines of the formula (I) and at least one further amine having at least four aliphatic amine hydrogens is present. This likewise includes the amine hydrogens from adducted amine of the formula (I).

Suitable further amines having at least four aliphatic amine hydrogens are especially commercially available amines having two primary amino groups and optionally further amino groups, especially 2,2-dimethylpropane-1,3-diamine, pentane-1,3-diamine (DAMP), pentane-1,5-diamine, 1,5-diamino-2-methylpentane (MPMD), 2-butyl-2-ethylpentane-1,5-diamine (C11-neodiamine), hexane-1,6-diamine, 2,5-dimethylhexane-1,6-diamine, 2,2(4),4-trimethylhexane-1,6-diamine (TMD), heptane-1,7-diamine, octane-1,8-diamine, nonane-1,9-diamine, decane-1,10-diamine, undecane-1,11-diamine, dodecane-1,12-diamine, 1-amino-3-aminomethyl-3,5,5-trimethylcyclohexane (IPDA), 1,2-diaminocyclohexane, 1,3-diaminocyclohexane, 1,4-diaminocyclohexane, 1,3-bis(aminomethyl)cyclohexane, 1,4-bis(aminomethyl)cyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 2(4)-methyl-1,3-diaminocyclohexane, 2,5(2,6)-bis(aminomethyl)bicyclo[2.2.1]heptane (NBDA), 3(4),8(9)-bis(aminomethyl)tricyclo[5.2.1.$0^{2,6}$]decane, 1,4-diamino-2,2,6-trimethylcyclohexane (TMCDA), menthane-1,8-diamine, 3,9-bis(3-aminopropyl)-2,4,8,10-tetraoxaspiro[5.5]undecane, 1,3-bis(aminomethyl)benzene (MXDA), 1,4-bis(aminomethyl)benzene, bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine or higher oligomers of these diamines, bis(3-aminopropyl)polytetrahydrofurans or other polytetrahydrofurandiamines, polyoxyalkylenediamines or -triamines, especially polyoxypropylenediamines or polyoxypropylenetriamines such as Jeffamine® D-230, Jeffamine® D-400 or Jeffamine® T-403 (all from Huntsman), diethylenetriamine (DETA), triethylenetetramine (TETA), tetraethylenepentamine (TEPA), pentaethylenehexamine (PEHA), dipropylenetriamine (DPTA), N-(2-aminoethyl)propane-1,3-diamine (N3 amine), N,N'-bis(3-aminopropyl)ethylenediamine (N4 amine), N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine, N,N'-bis(3-amino-1-ethylpropyl)-2-methylpentane-1,5-diamine, 3-(2-aminoethyl)aminopropylamine, bis(hexamethylene)triamine (BHMT), and also adducts of these amines with epoxy resins.

The further amine having at least four aliphatic amine hydrogens is preferably selected from the group consisting of TMD, IPDA, 1,3-bis(aminomethyl)cyclohexane, 1,4-bis(aminomethyl)cyclohexane and MXDA.

Among these, particular preference is given to 1,3-bis(aminomethyl)cyclohexane. A combination of 1,3-bis(aminomethyl)cyclohexane and the amine of the formula (I) in the curing agent component enables epoxy resin seals having particularly low odor, particularly rapid curing, particularly high extensibility and a particularly low tendency to yellowing.

The epoxy resin seal preferably contains other constituents, especially further curing agents, accelerators, fillers, pigments, thinners, surface-active additives and/or stabilizers.

Suitable further curing agents are those already mentioned, and especially amines having two or three aliphatic amine hydrogens, polyamido amines, phenalkamines, aromatic amines or mercaptans.

Suitable accelerators are especially acids or compounds hydrolyzable to acids, water, nitrates, tertiary amines or Mannich bases, especially salicylic acid, calcium nitrate, water or 2,4,6-tris(dimethylaminomethyl)phenol, or a combination of these accelerators.

Suitable fillers are, in particular, ground or precipitated calcium carbonate, which is optionally coated with fatty acid, especially stearates, baryte (heavy spar), talc, quartz flour, quartz sand, silicon carbide, iron mica, dolomite, wollastonite, kaolin, mica (potassium aluminum silicate), molecular sieve, aluminum oxide, zinc oxide, aluminum-doped zinc oxide, aluminum hydroxide, magnesium hydroxide, silica, cement, gypsum, fly ash, carbon black, graphite, metal powders such as aluminum, copper, iron, zinc, silver or steel, PVC powder or hollow beads. Among these, preference is given to calcium carbonate, quartz flour, quartz sand or a combination thereof.

Suitable pigments are especially titanium dioxides, iron oxides, chromium(III) oxides, organic pigments or carbon black.

Suitable thinners are especially xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butyl ether, propylene glycol butyl ether, propylene glycol phenyl ether, dipropylene glycol, dipropylene glycol monomethyl ether, dipropylene glycol dimethyl ether, dipropylene glycol di-n-butyl ether, 2,2,4-trimethylpentane-1,3-diol monoisobutyrate, diphenylmethane, diisopropylnaphthalene, mineral oil fractions, for example Solvesso® grades (from Exxon), alkylphenols such as tert-butylphenol, nonylphenol, dodecylphenol, cardanol, styrenized phenol, bisphenols, aromatic hydrocarbon resins, especially types containing phenol groups, alkoxylated phenol, especially ethoxylated or propoxylated phenol, especially 2-phenoxyethanol, adipates, sebacates, phthalates, benzoates, organic phosphoric or sulfonic esters or sulfonamides.

Preferred thinners have a boiling point above 200° C.

Particular preference is given to benzyl alcohol.

The epoxy resin seal preferably contains a small content of organic thinners having a boiling point of less than 200° C., especially less than 1% by weight.

The epoxy resin seal preferably contains a low content of thinners having a boiling point of more than 200° C., especially less than 10% by weight, preferably less than 5% by weight.

Such an epoxy resin seal causes a particularly low level of emissions during and after application.

Suitable surface-active additives are especially defoamers, deaerating agents, wetting agents, dispersants, leveling agents or dispersed paraffin wax. The epoxy resin coating preferably contains a combination of such additives.

Suitable stabilizers are especially stabilizers against UV radiation or heat.

The epoxy resin seal optionally contains further commercial auxiliaries and additives, especially rheology modifiers such as, in particular, antisettling agents, adhesion improvers, especially organoalkoxysilanes, or flame-retardant substances.

The epoxy resin seal is preferably not water-based. It preferably contains a water content of less than 5% by weight, especially less than 2% by weight, based on the overall epoxy resin seal. Such a seal is particularly robust with respect to hydrolysis.

The resin component and the curing agent component of the epoxy resin seal are stored in separate containers and mixed with one another only shortly before application. The resin component contains the compounds containing epoxy groups, and the curing agent component contains the compounds reactive with epoxy groups, while further ingredients may be present as a constituent of the resin component and/or the curing agent component.

Preference is given to an epoxy resin seal comprising

- a resin component containing at least one liquid epoxy resin, at least one defoamer, fillers, pigments and optionally further constituents, and
- a curing agent component comprising at least one amine of the formula (I), at least one further amine having at least four aliphatic amine hydrogens, optionally at least one thinner, especially benzyl alcohol, and optionally further constituents.

The components of the epoxy resin seal are mixed shortly before or during application. The mixing ratio is preferably chosen such that the molar ratio of the groups reactive toward epoxy groups relative to the epoxy groups is in the range from 0.5 to 1.5, especially 0.7 to 1.2. In parts by weight, the mixing ratio is typically in the range from 1:10 to 20:1, preferably 1:1 to 10:1.

The components are mixed continuously or batchwise by means of a suitable method, ensuring that not too much time elapses between the mixing of the components and the application, and that application is effected within the pot life.

The mixing and the application are especially effected at ambient temperature, which is typically in the range from about 5 to 40° C., preferably about 10 to 35° C.

The mixing of the components commences the curing of the epoxy resin seal by chemical reaction. Primary and secondary amino groups, and any further groups present that are reactive toward epoxy groups, react with the epoxy groups, resulting in ring opening thereof. As a result primarily of this reaction, the epoxy resin seal polymerizes and thereby cures.

The curing typically extends over a few hours to days. The duration depends on factors including the temperature, the reactivity of the constituents, the stoichiometry thereof, and the presence of accelerators.

In the freshly mixed state, the epoxy resin seal has low viscosity. The viscosity at 20° C. 5 minutes after the components have been mixed is preferably in the range from 100 to 3000 mPas, especially 500 to 2000 mPas, measured using a cone-plate viscometer at a shear rate of 10 $s^{-1}$.

The epoxy resin seal is applied to the polyurethane coating that has optionally been scattered with quartz sand.

The freshly mixed epoxy resin seal is applied within the pot life, preferably in a layer thickness in the range from 0.1 to 1 mm, especially 0.2 to 0.8 mm, especially with the aid of a doctor blade, a roller or a drum.

The curing typically gives rise to a homogeneous, even, shiny, nontacky film of high hardness and robustness, surprisingly high extensibility and good adhesion to the polyurethane coating and any quartz sand present. If the polyurethane coating has been scattered with an excess of quartz sand, the epoxy resin seal will cover the protruding sand grains, and the surface will have a correspondingly grainy and particularly slip-resistant structure.

Preferably, the epoxy resin seal has a layer thickness in the range from 0.1 to 1 mm, 0.2 to 0.8 mm.

The epoxy resin seal forms the uppermost layer and hence the surface of the floor.

The epoxy resin seal has surprisingly high extensibility. In particular, it has such an extensibility that a test specimen consisting of a polyurethane coating of thickness 2 mm and the epoxy resin seal applied thereto in a thickness of 0.5 mm, in a 3-point bending test with a braced width of 48 mm at a testing speed of 10 mm/min, enables a perpendicular deflection (maximum bending) with the seal on the pulling side in accordance with DIN EN ISO 178 of at least 7.5 mm, preferably at least 8 mm, especially at least 8.5 mm, before the epoxy resin seal breaks.

With its good adhesion to the polyurethane coating, high abrasion resistance and scratch resistance, and its high robustness with respect to cold conditions, heat, water, deicing salt, fuels, motor oil and customary detergents, its surprisingly high extensibility and its high esthetic standards, the epoxy resin seal assures a high-quality surface of the floor protection system, by means of which the floors of parking decks, for example, with high fissure movement and being driven over, are protected in a sustained manner.

The floor protection system of the invention enables surprisingly good crack bridging without cracks in the seal.

In particular, the floor protection system of the invention passes a test for dynamic crack bridging at −20° C. to EN 1062-7 method B 3.2 without cracks in the epoxy resin seal.

Such a floor protection system seals the floors of parking decks, for example, in a sustained manner and protects the floor beneath, especially steel-reinforced concrete, from penetrating moisture, deicing salt and other substances.

The floor protection system of the invention is preferably part of a parking deck or of a ramp that can be driven on. Parking decks refer to all kinds of open, semi-open or closed garages, multistory car parks, parking places or underground garages.

The present invention further provides a method of protecting floors, characterized in that an epoxy resin seal containing at least one amine of the formula (I) is applied in a layer thickness in the range from 0.1 to 1 mm, preferably 0.2 to 0.8 mm, to a polyurethane coating that has optionally been scattered with quartz sand, as described above.

Preferably, 5% to 80%, preferably 10% to 50%, of all the amine hydrogens present in the epoxy resin seal come from amines of the formula (I), and at least one further amine having at least four aliphatic amine hydrogens is present, preferably those mentioned above, especially 1,3-bis(aminomethyl)cyclohexane.

The polyurethane coating to which the epoxy resin seal is applied preferably has a layer thickness in the range from 2 to 6 mm and consists of one or more layers, wherein at least one of these layers has an elongation at break of at least 200%, especially at least 300%, determined at 23° C. to DIN EN 53504 at a strain rate of 200 mm/min.

More preferably, the polyurethane coating consists of two layers, where the lower layer has a thickness in the range from 1.2 to 3 mm and has an elongation at break of at least 200%, and the upper layer has a thickness in the range from 1.2 to 3 mm and has a tensile strength of at least 9 MPa.

Preferably, the polyurethane coating comprises quartz sand that has been scattered into and/or onto the polyurethane coating.

EXAMPLES

Working examples are adduced hereinafter, which are intended to further elucidate the invention described. The invention is of course not limited to these described working examples.

"AHEW" stands for amine hydrogen equivalent weight.

"EEW" stands for epoxy equivalent weight.

"Standard climatic conditions" ("SCC") refers to a temperature of 23±1° C. and a relative air humidity of 50±5%.

The chemicals used were unless otherwise stated from Sigma-Aldrich Chemie GmbH.

Substances and Abbreviations Used:

Araldite® GY 250: Bisphenol A diglycidyl ether, EEW 187 g/mol (from Huntsman)

Araldite® DY-E: Monoglycidyl ethers of $C_{12}$ to $C_{14}$ alcohols, EEW approx. 290 g/equiv. (from Huntsman)

Ancamine® K54 2,4,6-Tris(dimethylaminomethyl)phenol (from Air Products)

B-EDA N-Benzylethane-1,2-diamine, AHEW 50.1 g/equiv., prepared as described below DB-EDA N,N'-Dibenzylethane-1,2-diamine, AHEW 120.2 g/equiv.

1,3-BAC 1,3-Bis(aminomethyl)cyclohexane, AHEW 35.5 g/equiv. (from Mitsubishi Gas Chemical)

IPDA 1-Amino-3-aminomethyl-3,5,5-trimethylcyclohexane, AHEW 42.6 g/equiv. (Vestamin® IPD from Evonik)

MXDA 1,3-Bis(aminomethyl)benzene, AHEW 34 g/equiv. (from Mitsubishi Gas Chemical)

D-230 Polyoxypropylenediamine, average molecular weight 230 g/mol, AHEW 60 g/mol (Jeffamine® D-230, from Huntsman)

Sikafloor®-151: 2-component epoxy resin primer (from Sika)

Sikafloor®-376: 2-component polyurethane coating based on TDI-based polymer containing isocyanate groups and 3,5-dimethylthiotoluene-2,4(6)-diamine, having a tensile strength of ≥5 MPa, an elongation at break of ≥500% and a Shore A hardness of ≥60 (from Sika)

Sikafloor®-377: 2-component polyurethane coating based on polymeric MDI, castor oil and castor oil-based polyol, having a tensile strength of ≥11 MPa and an elongation at break of ≥50% (from Sika)

Sikafloor®-378: 2-component epoxy resin seal with a curing agent component based on IPDA, MXDA and D-230 (from Sika)

N-Benzylethane-1,2-diamine (B-EDA):

An initial charge of 180.3 g (3 mol) of ethane-1,2-diamine at room temperature was mixed with a solution of 106.0 g (1 mol) of benzaldehyde in 1200 ml of isopropanol and stirred for 2 hours, then hydrogenated at 80° C., hydrogen pressure 80 bar, and a flow rate of 5 ml/min in a continuous hydrogenation apparatus with a fixed bed Pd/C catalyst, and the hydrogenated solution was concentrated on a rotary evaporator at 65° C., removing unreacted ethane-1,2-diamine, water and isopropanol. The resultant reaction mixture was purified by distillation at 80° C. under reduced pressure. This gave a colorless liquid having an N-benzylethane-1,2-diamine content determined by GC of >97%.

Production of Epoxy Resin Seals:

Examples 1 to 8

For these examples, a resin component was produced by mixing the following ingredients by means of a centrifugal mixer (SpeedMixer™ DAC 150, FlackTek Inc.) and storing it with exclusion of moisture:

166.8 parts by weight of Araldite® GY 250, 26.7 parts by weight of Araldite® DY-E, 153.8 parts by weight of quartz flour, 4.4 parts by weight of defoamer, 61.3 parts by weight of silica gray pigment paste.

For each example, the ingredients of the curing agent component that are specified in tables 1 and 2 were mixed in the stated amounts (in parts by weight) by means of the centrifugal mixer and stored with exclusion of moisture.

The two components were then processed using the centrifugal mixer to give a homogeneous liquid, and this was tested immediately as follows:

Viscosity was measured 5 min after the resin component and the curing agent component had been mixed by means of a cone-plate viscometer at a shear rate of 10 $s^{-1}$ and a temperature of 20° C.

Gel time was determined by moving a freshly mixed amount of about 3 g under standard climatic conditions with a spatula at regular intervals until the mass gelated.

Shore D hardness was determined to DIN 53505 on two cylindrical test specimens (diameter 20 mm, thickness 5 mm), with storage of one under standard climatic conditions and one at 8° C. and 80% relative humidity. Hardness was measured here after 1 day, 2 days and 7 days in each case.

As a measure of the extensibility of the seal, each composition was applied to a cured polyurethane film in a layer thickness of 500 μm and left to cure under standard climatic conditions for 14 days. The cured polyurethane film was produced with Sikafloor®-376, which was mixed as specified and stored under standard climatic conditions in a layer thickness of 2 mm for 14 days. 3 specimens of 70×40×2.5 mm in each case were cut out of the layer composite thus produced, and these were used to conduct a 3-point bending test with a braced width of 48 mm at a testing speed of 10 mm/min with the seal on the pulling side (outside of the bend), in accordance with DIN EN ISO 178, with determination of the maximum bend or deflection of the sample perpendicularly at the maximum force.

The results are reported in Tables 1 and 2.

The examples designated "(Ref.)" are comparative examples.

TABLE 1

Composition and properties of examples 1 to 4.

| | Example | | | |
|---|---|---|---|---|
| | 1 (Ref.) | 2 | 3 | 4 |
| Resin component: | 413.0 | 413.0 | 413.0 | 413.0 |
| Curing agent component: | | | | |
| 1,3-BAC | 35.5 | 30.2 | 24.9 | 30.5 |
| B-EDA | — | 7.5 | 15.0 | — |
| DB-EDA | — | — | — | 16.8 |
| Benzyl alcohol | 10.0 | 10.0 | 10.0 | 10.0 |
| Ancamine ® K54 | 2.0 | 2.0 | 2.0 | 2.0 |
| Viscosity (5') [Pa · s] | 1.84 | 1.58 | 1.42 | 1.45 |
| Gel time [h:min] | 2:15 | 2:35 | 3:00 | 2:50 |
| Shore D (1 d SCC) | 81 | 84 | 76 | 78 |
| (2 d SCC) | 82 | 85 | 85 | 80 |
| (7 d SCC) | 85 | 86 | 85 | 80 |
| Shore D (1d 8°/80%) | 73 | 73 | 69 | 68 |

TABLE 1-continued

Composition and properties of examples 1 to 4.

| | Example | | | |
|---|---|---|---|---|
| | 1 (Ref.) | 2 | 3 | 4 |
| (2 d 8°/80%) | 82 | 81 | 81 | 83 |
| (7 d 8°/80%) | 85 | 81 | 82 | 85 |
| Maximum bend [mm] | 7.9 | 8.8 | 9.6 | 9.0 |

TABLE 2

Composition and properties of examples 5 to 8.

| | Example | | | |
|---|---|---|---|---|
| | 5 (Ref.) | 6 | 7 | 8 (Ref.) |
| Resin component: | 413.0 | 413.0 | 413.0 | 413.0 |
| Curing agent component: | | | | |
| IPDA | 21.3 | 14.9 | 17.0 | 14.9 |
| MXDA | 17.0 | 11.9 | 13.6 | 11.9 |
| B-EDA | — | 15.0 | — | — |
| DB-EDA | — | — | 18.0 | — |
| D-230 | — | — | — | 18.0 |
| Benzyl alcohol | 10.0 | 10.0 | 10.0 | 10.0 |
| Ancamine ® K54 | 2.0 | 2.0 | 2.0 | 2.0 |
| Viscosity (5') [Pa · s] | 1.88 | 1.59 | 1.57 | 1.48 |
| Gel time [h:min] | 3:00 | 3:10 | 3:30 | 4:10 |
| Shore D (1 d SCC) | 80 | 80 | 72 | 72 |
| (2 d SCC) | 81 | 81 | 78 | 77 |
| (7 d SCC) | 83 | 85 | 83 | 83 |
| Shore D (1d 8°/80%) | 49 | n.d. | n.d. | n.d. |
| (2 d 8°/80%) | 82 | 72 | 60 | 60 |
| (7 d 8°/80%) | 84 | 82 | 72 | 72 |
| Maximum bend [mm] | 6.3 | 8.0 | 9.4 | 7.0 |

"n.d." stands for "not determined" (too soft)

Production of Floor Protection Systems:

Example 9

Three concrete prisms of dimensions (length x width x height) 225×160×50 mm were primed with 0.5 kg/$m^2$ Sikafloor®-151, and the still-wet primer was sparingly sanded with 0.8 kg/$m^2$ of 0.3 to 0.8 mm quartz sand.

After a curing time of 24 h, 1.9 kg/$m^2$ of the polyurethane coating Sikafloor®-376 as sealing layer was applied and left to cure for 24 h.

Subsequently, 1.7 kg/$m^2$ of the polyurethane coating Sikafloor®-377 was applied as wear layer, into which 0.85 kg/$m^2$ of 0.1 to 0.3 mm quartz sand had been scattered, and then the surface of the still-wet coating was scattered with an excess of 0.3 to 0.8 mm quartz sand. After a curing time of 24 h, the excess quartz sand was removed by means of a brush and vacuum cleaner.

Finally, the epoxy resin seal from example 2 was applied in an amount of 0.7 kg/$m^2$ by means of a roller to the polyurethane coating scattered with quartz sand, and left to cure.

The epoxy resin seal showed excellent workability with barely any odor, good leveling and good deaeration. The resultant gray-pigmented surface was even, hard, shiny, nontacky and free of streaks or cloudiness.

The structure corresponds to an OS 11 a surface protection system according to DIN EN 1504-2.

After storage under standard climatic conditions for 14 days, followed by 7 days in an air circulation oven at 70° C., the concrete prisms coated with the floor protection system were tested for dynamic crack bridging at −20° C. to EN 1062-7 method B. For this purpose, a crack was made in the concrete prism without damaging the floor protection system. The test was conducted according to method B 3.2 with a lower crack width of 0.1 mm, an upper crack width of 0.3 mm and a change in crack width of 0.2 mm with 1000 crack cycles at a frequency of 0.03 Hz. After the test, the floor protection system on the three prisms was checked visually for cracks in the region of the polyurethane coating and in the epoxy resin seal. The results are reported in table 3.

Example 10

A further three concrete prisms were coated with a floor protection system as described for example 9. The structure of the floor protection system and the result of the testing for dynamic crack bridging are reported in table 3.

This structure corresponds to an OS 10 surface protection system according to DIN EN 1504-2.

The test was conducted according to method B 4.2 with a lower crack width of 0.2 mm, an upper crack width of 0.5 mm and a change in crack width of 0.3 mm with 1000 crack cycles at a frequency of 0.03 Hz.

Examples 11 (Ref.) and 12 (Ref.)

As a comparison, 3 concrete prisms in each case, as specified for examples 9 and 10, were coated with a floor protection system, using a noninventive epoxy resin seal: Sikafloor®-378 (2-component epoxy resin seal with a curing agent based on IPDA, MXDA and D-230, from Sika). The structure of the floor protection systems and the results of the testing for dynamic crack bridging are reported in table 3.

TABLE 3

Structure and results of examples 9 to 12

| | Example | | | |
|---|---|---|---|---|
| | 9 | 10 | 11 (Ref.) | 12 (Ref.) |
| Substrate: | polished concrete | | polished concrete | |
| Primer: | Sikafloor ®-151 0.5 kg/m$^2$ | | Sikafloor ®-151 0.5 kg/m$^2$ | |
| Seal layer (polyurethane): | Sikafloor ® 376 1.9 kg/m$^2$ | Sikafloor ® 376 2.5 kg/m$^2$ | Sikafloo r® 376 1.9 kg/m$^2$ | Sikafloo r® 376 2.5 kg/m$^2$ |
| Wear layer (polyurethane): | Sikafloor ® 377 1.7 kg/m$^2$, filled with 0.85 kg/m$^2$ of 0.1 to 0.3 mm quartz sand | Sikafloor ® 377 2.2 kg/m$^2$, filled with 1.1 kg/m$^2$ of 0.1 to 0.3 mm quartz sand | Sikafloor ® 377 1.7 kg/m$^2$, filled with 0.85 kg/m$^2$ of 0.1 to 0.3 mm quartz sand | Sikafloor ® 377 2.2 kg/m$^2$, filled with 1.1 kg/m$^2$ of 0.1 to 0.3 mm quartz sand |
| scattered with an excess of: | 0.3 to 0.8 mm quartz sand | | 0.3 to 0.8 mm quartz sand | |
| Epoxy resin seal: | from example 2 0.7 kg/m$^2$ | | Sikafloor®-378 0.7 kg/m$^2$ | |
| Structure corresponding to | OS 11 a | OS 10 | OS 11 a | OS 10 |
| Dynamic crack bridging at −20° C.: | Method B 3.2: no cracks, either in the polyurethane coating or in the seal | Method B 4.2: no cracks, either in the polyurethane coating or in the seal | Method B 3.2: cracks in the seal | Method B 4.2: cracks in the seal |
| Passed? | yes | yes | no | no |

The invention claimed is:

1. A floor protection system configured to be applied to a floor substrate and comprising in order from a floor substrate side:
   - (i) optionally at least one epoxy resin primer,
   - (ii) at least one polyurethane coating,
   - (iii) optionally quartz sand, scattered into and/or onto the polyurethane coating, and
   - (iv) an epoxy resin seal obtained from a resin component containing at least one liquid epoxy resin and a curing agent component containing at least one amine of the formula (I)

$$Z\text{—NH-A-NH—}CH_2\text{—}Y \qquad (I)$$

where

A is a divalent $C_2$ to $C_{15}$ alkylene, cycloalkylene or arylalkylene radical optionally containing one or more nitrogen atoms or ether groups, Z is H or —$CH_2$—Y and Y is H or a $C_1$ to $C_{11}$ alkyl, cycloalkyl, arylalkyl or aryl radical, wherein the two nitrogen atoms to which the A radical is bonded are separated from one another by at least two carbon atoms, and the amine of the formula (I) contains a total of at least 8 carbon atoms, and wherein the polyurethane coating consists of one or more layers, and at least one of these layers has an elongation at break of at least 300%, determined at 23° C. to DIN EN 53504 at a strain rate of 200 mm/min.

2. The floor protection system as claimed in claim 1, wherein the polyurethane coating has a layer thickness in the range from 2 to 6 mm.

3. The floor protection system as claimed in claim 1, wherein the polyurethane coating consists of two layers, wherein the lower layer has a thickness in the range from 1.2 to 3 mm and an elongation at break of at least 200%, and the upper layer has a thickness in the range from 1.2 to 3 mm and a tensile strength of at least 9 MPa and has optionally been filled and/or scattered with quartz sand, wherein tensile strength and elongation at break are determined at 23° C. to DIN EN 53504 at a strain rate of 200 mm/min.

4. The floor protection system as claimed in claim 1, comprising quartz sand scattered onto the polyurethane coating.

5. The floor protection system as claimed in claim 1, wherein A is selected from the group consisting of 1,2-ethylene, 1,2-propylene, 1,3-propylene, 1,4-butylene, 1,3-butylene, 2-methyl-1,2-propylene, 1,3-pentylene, 1,5-pentylene, 2,2-dimethyl-1,3-propylene, 1,6-hexylene, 2-methyl-1,5-pentylene, 1,7-heptylene, 1,8-octylene, 2,5-dimethyl-1,6-hexylene, 1,9-nonylene, 2,2 (4),4-trimethyl-1,6-hexylene, 1,10-decylene, 1,11-undecylene, 2-butyl-2-ethyl-1,5-pentylene, 1,12-dodecylene, 1,2-cyclohexylene, 1,3-cyclohexylene, 1,4-cyclohexylene, (1,5,5-trimethylcyclohexan-1-yl) methane-1,3, 4 (2)-methyl-1,3-cyclohexylene, 1,3-cyclohexylenebis (methylene), 1,4-cyclohexylenebis (methylene), 1,3-phenylenebis (methylene), 1,4-phenylenebis (methylene), 3-oxa-1,5-pentylene, 3,6-dioxa-1,8-octylene, 4,7-dioxa-1,10-decylene, 3-aza-1,5-pentylene, 3,6-diaza-1,8-octylene, 4,7-diaza-1,11-decylene and 3-aza-1,6-hexylene.

6. The floor protection system as claimed in claim 1, wherein Y is selected from the group consisting of H, methyl, ethyl, propyl, isopropyl, butyl, pentyl, heptyl, hept-2-yl, phenyl, 4-methylphenyl, 4-isopropylphenyl, 4-tert-butylphenyl, 4-methoxyphenyl, 4-dimethylaminophenyl, 1-naphthyl, benzyl and cyclohexyl.

7. The floor protection system as claimed in claim 1, wherein A is 1,2-ethylene and Y is phenyl.

8. The floor protection system as claimed in claim 1, wherein 5% to 80% of all amine hydrogens present in the curing agent component come from amines of the formula (I) and at least one further amine having at least four aliphatic amine hydrogens is present.

9. The floor protection system as claimed in claim 8, wherein the further amine having at least four aliphatic amine hydrogens present is 1,3-bis(aminomethyl) cyclohexane.

10. The floor protection system as claimed in claim 1, wherein the epoxy resin seal has a layer thickness in the range from 0.1 to 1 mm.

11. The floor protection system as claimed in claim 1, wherein it passes a test for dynamic crack bridging at −20° C. to EN 1062-7 method B 3.2 without cracks in the epoxy resin seal.

12. A method of protecting floors, wherein an epoxy resin seal comprising at least one amine of the formula (I)

$$Z—NH-A-NH—CH_2—Y \quad (I)$$

where

A is a divalent $C_2$ to $C_{15}$ alkylene, cycloalkylene or arylalkylene radical optionally containing one or more nitrogen atoms or ether groups, Z is H or $—CH_2—Y$, and Y is H or a $C_1$ to $C_{11}$ alkyl, cycloalkyl, arylalkyl or aryl radical, wherein the two nitrogen atoms to which the A radical is bonded are separated from one another by at least two carbon atoms, and the amine of the formula (I) contains a total of at least 8 carbon atoms, in a layer thickness in the range from 0.1 to 1 mm is applied on top of a polyurethane-coated flooring wherein the polyurethane has optionally been scattered with quartz sand, and wherein the polyurethane consists of one or more layers, and at least one of these layers has an elongation at break of at least 300%, determined at 23° C. to DIN EN 53504 at a strain rate of 200 mm/min.

13. The method as claimed in claim 12, wherein 5% to 80% of all amine hydrogens present in the epoxy resin seal come from amines of the formula (I) and at least one further amine having at least four aliphatic amine hydrogens is present.

14. The method as claimed in claim 12, wherein the polyurethane coating has a layer thickness in the range from 2 to 6 mm.

* * * * *